United States Patent [19]

Phillips et al.

[11] 4,365,589

[45] Dec. 28, 1982

[54] METHODS OF AND/OR APPARATUS FOR MILKING ANIMALS

[75] Inventors: Evan M. Phillips; Thomas D. Millar, both of Hamilton, New Zealand

[73] Assignee: AHI Operations Limited, Manukau City, New Zealand

[21] Appl. No.: 214,427

[22] Filed: Dec. 8, 1980

[30] Foreign Application Priority Data

Dec. 20, 1979 [NZ] New Zealand .................. 192474

[51] Int. Cl.³ ............................ A01J 5/04; A01J 5/12
[52] U.S. Cl. ............................... 119/14.02; 119/14.36; 119/14.55
[58] Field of Search ............... 119/14.02, 14.08, 14.14, 119/14.36, 14.54, 14.55

[56] References Cited

U.S. PATENT DOCUMENTS

| | | | |
|---|---|---|---|
| 2,718,208 | 9/1955 | Tanner | 119/14.08 |
| 3,762,371 | 10/1973 | Quayle et al. | 119/14.14 |
| 3,776,196 | 12/1973 | Luiz | 119/14.36 |
| 4,280,445 | 7/1981 | Phillips | 119/14.02 |

FOREIGN PATENT DOCUMENTS 1160900 8/1969 United Kingdom ............ 119/14.54

Primary Examiner—Hugh R. Chamblee
Attorney, Agent, or Firm—Holman & Stern

[57] ABSTRACT

A claw for connecting teat cups to a milk line of a milking machine has a plurality of individual chambers with a milk inlet leading from a teat cup into each chamber and an outlet leading from each chamber to a common chamber in the milk line, the inlets, outlets and chambers being positioned and shaped to give a swirling or vortex action to fluid in the chambers that the normal direction of flow of fluid from the teat cups to the milk line cannot be easily reversed thus substantially preventing back flow of milk to the teat cups and cross flow of milk between teat cups.

A rapid flow of fluid from any of the outlets will tend to induce an increase in flow velocity of air passing from an air inlet to the milk line which in turn will tend to increase a parallel flow outwardly from each of the other outlets.

14 Claims, 4 Drawing Figures

METHODS OF AND/OR APPARATUS FOR MILKING ANIMALS

BRIEF SUMMARY OF THE INVENTION

This invention relates to methods of and/or apparatus for milking animals.

In the milking of lactating animals (cows) it is usual to provide a connecting unit usually and herein referred to as a claw to join each of the four teat cups together, to collect the milk from each teat cup and to provide a central connection point through which vacuum and air pulsation may be applied to the teat cup.

It is well known that under adverse milking conditions, such as when a teat cup slips off a teat or some other event occurs which occasions a large air leak at a teat cup, and even sometimes during normal milking, milk or particles of milk may travel from one teat to another (or the others), or when the claw is handled or suspended between milkings, milk may flow back to the claw from the system piping or from claw to teat cup. If this milk is contaminated or carries bacteria from an infected teat or quarter, the infected milk may cause further infections in other quarters of the same cow, or in cows subsequently milked with the same milking cluster.

With a milking claw of current or standard design, there is no provision to prevent back flow of milk and/or air so that when a teat becomes dislodged, air at atmospheric pressure will fill that claw. The claw is then at a higher (or positive) pressure than the residual vacuum level remaining in the teat cups around the teat ends so milk particles may be forced to travel back towards those teat ends. It has been widely accepted that this is one of the most dangerously effective mechanisms for transmitting or transferring infected or bacteria laden milk from one teat to another or from a previously milked cow to that cow currently being milked.

It is therefore an object of the present invention to provide a method of and/or apparatus for milking animals which will obviate or minimise the disadvantages above outlined or which will at least provide the public with a useful choice.

Accordingly in one aspect the invention consists in a method of milking animals using a milking machine which method includes the steps of directing the fluid emanating from each teat cup of a cluster of teat cups into an individual chamber for that teat cup, causing the flow of fluid in each said individual chamber to give a swirling action such that milk already in the chamber cannot re-enter the fluid inlet from the teat cup to the chamber without a marked change in direction and directing fluid emanating from each of said individual chambers into a milk tube leading from the cluster of teat cups to a milk line of the milking machine in a manner such that the interchange of milk between said teat cups is obviated or minimised.

In a further aspect the invention may broadly be said to consist in apparatus for use in a milking machine for milking animals, said apparatus comprising a claw body, a plurality of individual chambers in said body, a milk inlet, which in use is connected to the interior of a teat cup, arranged in each said chamber so that there is one said individual chamber for each teat cup in a cluster of teat cups associated in use with said claw, an individual chamber outlet from each said individual chamber leading in use to a milk line connected to a milking machine, said inlet and said outlets from each individual chamber being arranged and each individual chamber being shaped so that fluid entering any one of said individual chambers creates a swirling or vortex action therein such that re-entry of milk from said selected individual chamber to its associated teat cup is substantially prevented.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTIONS OF THE SEVERAL VIEWS OF THE DRAWINGS

One preferred form of the invention and modifications thereof will now be described with reference to the accompanying drawings in which:

FIG. 1 is a part sectional plan view of a lower part of a milking machine claw incorporating the invention, FIG. 2 is a typical cross section of the construction shown in FIG. 1 with a cover in position, and FIGS. 3 and 4 show partly sectioned worm's eye view of alternative forms of cover.

DETAILED DESCRIPTION

Figure 1:
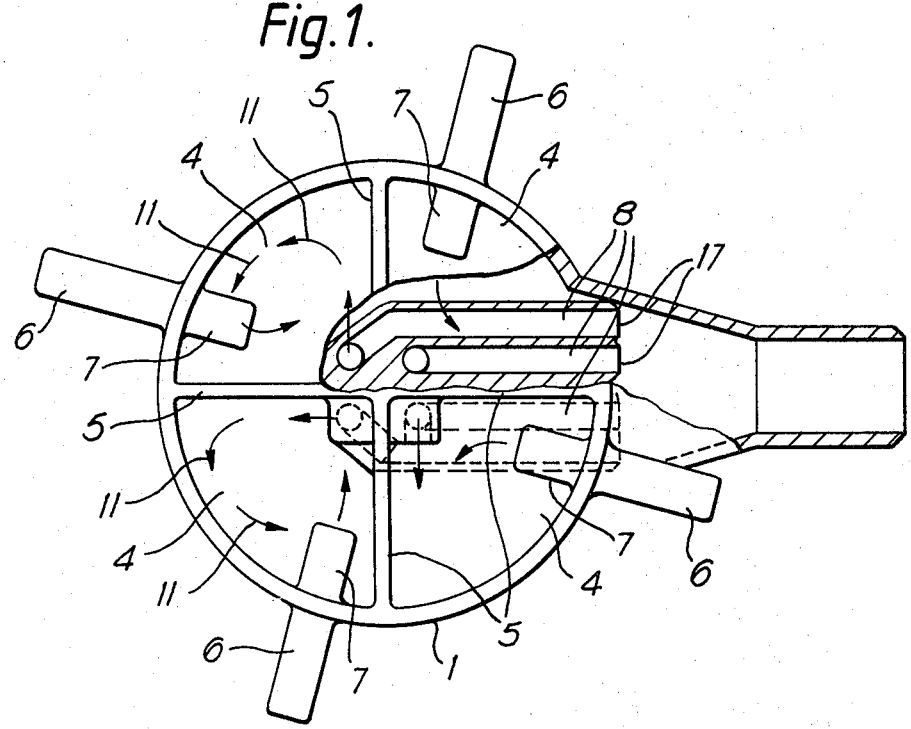
Figure 2:
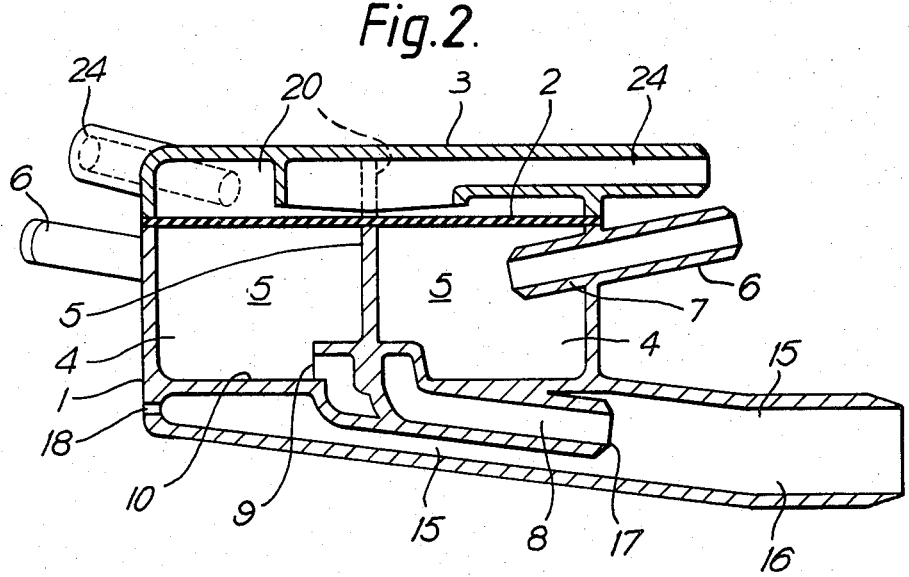

Referring to the drawings a milking claw for the use in a milking machine of known construction comprises a body 1 and a diaphragm 2 between the body 1 and a cover 3. The body 1 is divided into four equal individual chambers 4 by dividing walls 5. Milk inlets 6 are provided through which milk is introduced into the individual chambers from the inner cavities of four teat cups to which they are connected in use. The inlets 6 comprise short tubes 7 parts of which extend into and are positioned in an upper part in use of the chamber 4 in a direction such and the shape of each of the chambers 4 is such that when flow velocity is great enough a vortex or swirling movement is created in each or any of the chambers 4. The vortex is similarly created in the chamber 4 if a fluid flow of adequate velocity is introduced through further outlet conduits 8 having orifices 9. The lowest part of each of the orifices 9 of the conduits 8 from each of the chambers 4 are arranged to be level with the bottom 10 of the chambers 4 so that milk in the chambers 4 will readily flow into the outlet conduit 8. Each of the orifices 9 of the conduits 8 is directed at approximately 90° in the vertical plane from the axes of conduits 7 so that they face "downstream" to the direction of motion of the vortices or swirls indicated by the arrows 11. The shape of the walls 5 of the chambers 4 may be modified from the shape shown to give an enhanced swirling effect. The effect is such that milk flowing in through the inlets 6 follows the direction of arrows 11. Under normal milking conditions with little if any air admitted at a teat cup the milk velocity in and through the chambers 4 is low and so little or no turbulence occurs, most of the swirling or vortex action taking place below the level of the tubes 7.

When there is a rapid inrush of air through conduit 7, e.g. because a teat cup has fallen off a teat, a vortex is created in chamber 4 which will tend to throw milk particles out against the sides of chamber 4 and air, which can change direction relatively easily being of low mass, changes direction to exit through orifice 9 and conduit 8 while milk, being of a greater mass, will tend to be left behind in chamber 4.

Similarly, if air should for any reason be forced to enter through conduit 8 and orifice 9, the same will apply. Fluid may re-exit at orifice 9 but the volume of fluid flow creates a vortex which will allow air to exit through conduit 7 but not milk particles since air being of a lower mass will change direction to enable it to exit whereas milk of heavier mass tends to remain behind.

Additionally, though less importantly, any milk in the swirling fluid must change substantially in direction to blow back through the inlet tubes 7 and any such change must be of a marked nature.

The outlet conduits 8 pass through a common chamber 15 in the lower section of the body 1 and are held in a parallel manner to a point where they just enter into a milk line outlet nipple 16 at 17. The outlet conduits 8 do not touch the sides of the common chamber 15 or outlet nipple 16 but are tapered on the outside. Under conditions of cup slip when there is a massive inrush of air through inlet 7, chamber 4, and conduit 8 this rush of air exiting from conduit 8 and heading off through outlet 16 tends to induce a laminar flow of air from an air inlet hole 18 over the outsides of 8 which in turn will tend to induce an outwards flow from the other orifices 8 and through the outlet nipple 16 which is connected by flexible hose to the milk line of the milking machine in the known way.

In the event that one or more teat cups becomes dislodged from the cow's teats, air under atmospheric pressure will rush into such dislodged teat cup or cups through the claw and into the milk outlet hose connected to the nipple 16. Under these circumstances the violent inrush of air will create a vortex in each of the chambers 4 connected to the dislodged teat cup or cups. This will tend to swirl any milk in these sections of the system in these chambers towards the outsides of such chambers. The rapid efflux of air through the conduit 8 from each of these chambers 4 connected to the dislodged teat cup or cups tends to accelerate the air/milk mixture in outlet nipple 16 and the milk hose which in turn will tend to draw the milk/air mixture or induce milk/air flow from those conduits 8 which lead from chambers 4 to which are connected those teat cups that have not been dislodged and which are still milking. If because of restrictions in the tube connecting output nipple 16 to the milking system or for any other reason fluid (air or a milk/air mixture) is forced to flow back up conduits 8 to one or more of cavities 4 the fluid will emerge from the conduits 8 via orifices 9 in a direction heading downstream to a vortex set up by fluid flow from milk inlet tube 7. More importantly in this instance tube or conduit 7 is heading downstream to a vortex set up by fluid flow into chamber 4 from orifice 9. Since milk particles in this fluid would tend to be displaced by their own mass to the outside of such a vortex and away from the inner end of conduits 7 as well as their having to reverse direction to enter conduit 7, it is extremely unlikely that milk particles could by passing through conduit 7 reach the inside of the teat cup and the teat end. Thus any back flow of milk or milk/air mixture up to the undislodged teat cups or to or towards the section of the claw from which it may flow or be forced by pressure differences up to those teat cups will be substantially prevented.

Figure 3:
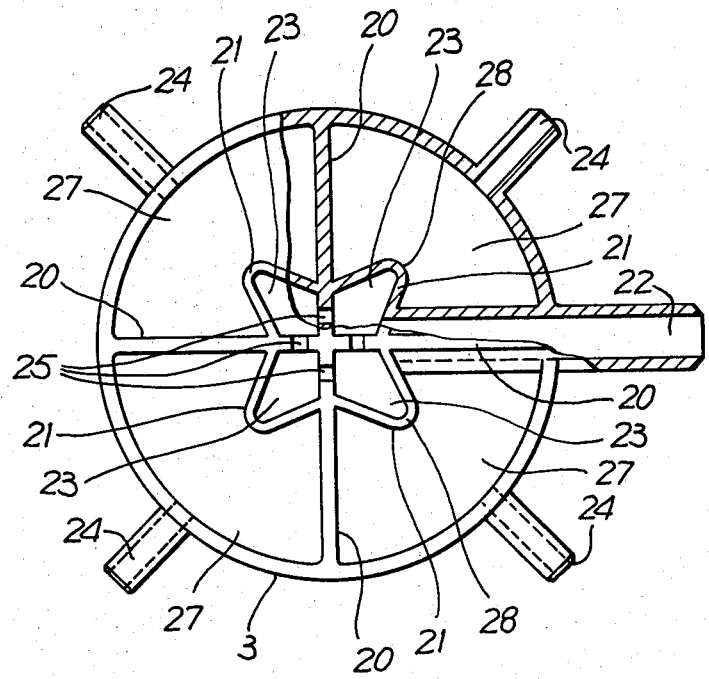
Figure 4:
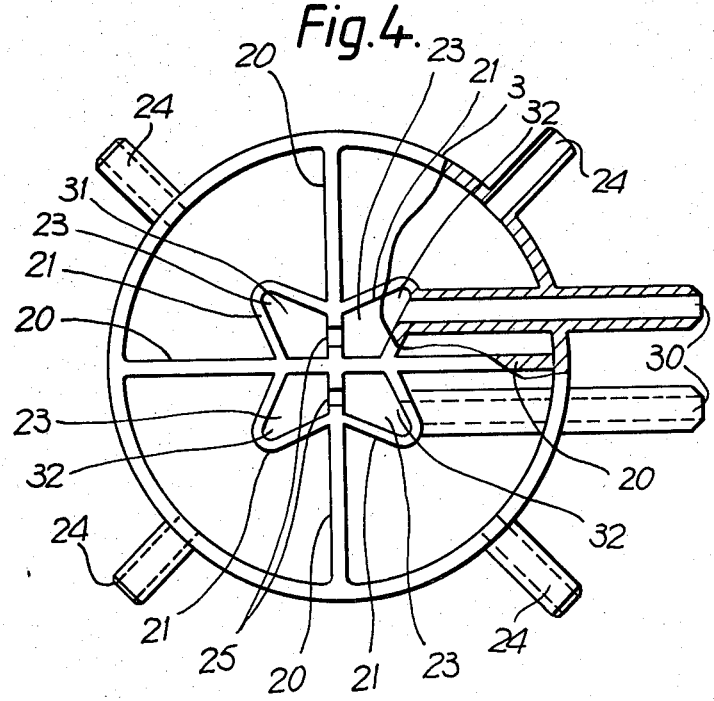

The above describes a simple action of the chambers 4 to which the diaphragm 2 acts in effect as a lid. The invention also envisages in addition that the diaphragm 2 covers and closes off the chambers 4 in a body 1 by seating on the top edges of the partitions 5 and the construction is such that the diaphragm 2 is firmly pressed and sealed against the top edges of the divisions 5 by divisions 20 in the top cover 3 (FIGS. 3 and 4) which coincide in position with the divisions.

A wedge shaped valve seat 21 is formed above each of the chambers 4. Vacuum and/or air pulses are supplied from a pulsator valve of the milking machine with which the claw is associated in use through a flexible tube connected to a nipple 22 which leads to the central chambers 23 formed in part by the wedged shaped valve seats and in part by the tops of the divisions 20. The vacuum and/or air pulses then pass when the diaphragm is appropriately positioned to the teat cup outer chamber via nipples 24. Drilled ports 25 which do not interrupt the continuity of the sealing edges of the partitions 20 ensure that each central chamber 23 formed by the valve seats 21 is connected to nipple 22. The space or opening between the diaphragm 2 and the valve seats 21 will be controlled by the vacuum level or pressure at any given instant in each of the chambers 4 so that in effect the level of the pulsation vacuum applied to each teat cup is controlled by and will be very close to the level of the "milking vacuum" due to the balance between the vacuum in the chambers 27 and the vacuum in the chambers 4. Each or any section of the diaphragm 2 when moving away from a valve seat 21 under the influence of vacuum in a chamber 4 will separate from the valve seat 21 progressively starting from the narrow end 28 to give very smooth regulation of vacuum in the corresponding nipple 24 and consequently in the exterior chamber of the teat cup. This is a most helpful feature in the prevention of cross flow of milk from teat cup to teat cup or a back flow from claw to teat cup because if when the vacuum pulse is introduced to the teat cup outer chamber that pulse is at a higher vacuum level (lower pressure) than that vacuum level inside the teat cup below the teat ends movement of the cup liner from the collapsed state which pertains during the pulsation pressure phase to its normal cylindrical form will be rapid and this will tend to create a short term low pressure (high vacuum) area inside the liner just below the teats. This higher vacuum condition even though of short duration will contribute to backward movement of milk droplets towards the teat and if these milk droplets contain unwanted bacteria these may infect that teat.

Thus it will be seen that the addition of the vacuum balancing feature as between the upper and lower chambers on either side of the diaphragm 2 will, by tending to reduce the vacuum imbalances which produce backward movement of milk particles, assist the vortex or swirling and the flow accelerating jet system in almost complete if not entirely complete elimination of those unwanted flows.

When 4+0 pulsation is used (that is all teat cups are pulsed at the same time) a single pulsator connecting nipple 22 is provided. If the claw is to be used with a 2+2 system in which four teat cups are pulsed in alternative pairs, the construction of FIG. 4 will be utilised in which two nipples 30 are provided each of which connects to two only of the chambers 31 and 32. Since each section of the claw is isolated from the other sections pulsator pulses may be applied to those sections in any chosen manner and the level of the pulsation vacuum will in each instance be controlled by the milking vacuum in chambers 4. Further design features in this claw will provide fluid collection chambers in chamber 15 and chambers 4. Under static or non-milking conditions when a claw is inverted or suspended from its connecting tubes milk may flow backwards again carrying bacteria with it that is to say milk from the tube which connects the nipple 16 to the milk line may flow back into the claw. In a standard claw this back flow of milk will enter the claw central chamber and even flow back into the teat cups. In the claw herein described milk flowing back into the nipple 16 must first fill the chamber 15 before flowing into conduits 8 and it must then fill the chambers 4 sufficiently to flow into the conduits 7 before it may flow towards the teat cups. The chamber 15 is of sufficient capacity to contain any likely milk back flow on its own without the milk reaching the chambers 4. Further if milk were to flow back from a teat cup into a chamber 4 it could not be of sufficient quantity to fill chamber 4 to a point where it could flow out through conduits 7 and it is even more unlikely that it could fill the chamber 15 to flow back down the conduits 7 to reach the other teat cups.

It will thus be seen that both under milking conditions and non-milking conditions it is extremely unlikely if not impossible for a back flow of milk to reach a teat or for cross flow from teat to teat to occur. These features make this claw a most valuable efficient and relatively inexpensive weapon in the war against mastitis and other udder infections. Tests have shown that normal milking performance is good and at least comparable to good claws of a standard design.

The two fluidic mechanisms that is to say the induced vortex in chamber 4 and the flow accelerating jet system in chamber 15 plus the vacuum balancing features of the claw in the preferred form of the invention effectively prevent or limit cross infection or milk carrying infection during milking. Actual tests of a live bacterial staining of tests and swabbing of both sections of this claw and at the teat ends have shown that bacterial density reductions in excess of 1000:1 at each inlet chamber and approximately 1000,000:1 reduction over the claw from teat to teat when a cup is deliberately slipped or removed from the teat during milking.

What is claimed is:

1. A method of milking animals using a milking machine which method includes the steps of directing the fluid emanating from each teat cup of a cluster of teat cups through an inlet into an individual chamber for that teat cup, causing the flow of fluid in each said individual chamber to produce a swirling action such that milk already in the chamber cannot re-enter the fluid inlet from the teat cup to the chamber without a marked change in direction, and directing fluid emanating from each of said individual chambers into a conduit leading to a milk line of the milking machine in a manner such that the interchange of milk between said teat cups is obviated or minimized.

2. A method as claimed in claim 1 wherein said swirling or vortex action is accentuated when said fluid flow is augmented by a rapid inrush of air into an individual chamber through said inlet caused by dislodgement of the teat cup connected to that individual chamber, said accentuated swirling or vortex action forcing said milk to the outside of said individual chamber so that the inrushing air will readily flow to an outlet in said chamber.

3. Apparatus for use in a milking machine for milking animals, said apparatus comprising a claw body, a plurality of individual chambers in said body, a milk inlet, which in use is connected to the interior of a teat cup, arranged in each said chamber so that there is one said individual chamber for each teat cup in a cluster of teat cups associated in use with said claw, each milk inlet comprising a short tube extending through said claw body and protruding from the inside thereof into said chamber, an individual chamber outlet from each said individual chamber leading in use to a milk line connected to a milking machine, said inlet and outlet of each individual chamber being positioned with respect to each other and said chamber and each individual chamber being shaped so that fluid entering any one of said individual chambers creates a swirling or vortex action therein such that re-entry of milk from said any one of said individual chambers to its associated teat cup is substantially prevented.

4. Apparatus as claimed in claim 3 wherein said individual chamber outlet comprises an orifice directed at an angle to the vertical plane of the axis of said inlet tube in the downstream direction with respect to said swirling or vortex motion within each chamber and the lower part of said orifice is level with the bottom of said individual chamber so that when a rush of air enters an individual chamber through the inlet thereto caused by dislodgement of a teat cup connected to that individual chamber, milk in that individual chamber is thrown to the outside of that chamber so that said air will flow readily through the outlet orifice in that individual chamber.

5. A method of milking animals using a milking machine comprising the steps of directing the fluid emanating from each teat cup of a cluster of teat cups through an inlet into an individual chamber for that teat cup, causing the flow of fluid in each said individual chamber to give a swirling action such that milk already in the chamber cannot re-enter the fluid inlet from the teat cup to the chamber without a marked change in direction in a manner such that the interchange of milk between said teat cups is obviated or minimized, and directing fluid emanating from each of said individual chambers into a common chamber leading to a milk tube which leads to a milk line of the milking machine, creating a swirling or vortex action in said common chamber such that flow of milk into said individual chambers from said common chamber is substantially prevented, said swirling or vortex action being accentuated when said flow of fluid is augmented by a rapid inrush of air.

6. A method of milking animals using a milking machine comprising the steps of directing the fluid emanating from each teat cup of a cluster of teat cups through an inlet into an individual chamber for that teat cup, causing the flow of fluid in each said individual chamber to give a swirling action such that milk already in the chamber cannot re-enter the fluid flow from the teat cup to the chamber without a marked change in direction, directing fluid emanating from each of said individual chambers into a milk tube leading to a milk line of the milking machine in a manner such that the interchange of milk between said teat cups is obviated or minimized, applying a pulsating vacuum, in use, to the outer cavity of the teat cups and also to a pulsation chamber on one side of a pressure sensitive member forming a cover on each said individual chamber and balancing the vacuum applied to each said individual chamber through said milk tube by causing said pressure sensitive member to control valve means in a manner such that the vacuum applied in use to said outer cavities is substantially balanced against the vacuum applied through each said individual chamber to the inner compartment of the teat cup.

7. A method as claimed in claim 6 which includes the step of using one surface of a diaphragm which forms said pressure sensitive member as a valve member to engage a greater or lesser proportion of a valve seat to provide said vacuum control.

8. A method as claimed in claim 6 which includes the steps of causing said pressure sensitive member to be exposed on one surface thereof to vacuum applied to the pulsator cavities of said teat cups and on an opposite surface thereof to vacuum applied to the interiors of the teat cups and allowing positional variations of the pressure sensitive member to actuate said valve means to control the maximum pulsation vacuum to be not greater than the vacuum in said interiors.

9. A method as claimed in claim 8 which includes the step of controlling said maximum pulsation vacuum to be substantially equal to the vacuum in said interiors of said teat cups.

10. Apparatus for use in a milking machine for milking animals, comprising a claw body, a plurality of individual chambers in said body, a milk inlet, which in use is connected to the interior of a teat cup, arranged in each said chamber so that there is one said individual chamber for each teat cup in a cluster of teat cups associated in use with said claw, an individual chamber outlet from each said individual chamber, each said inlet and outlet of each individual chamber being arranged and each individual chamber being shaped so that fluid entering any one of said individual chambers creates a swirling or vortex action therein such that re-entry of milk from any one of said individual chambers to its associated teat cup is substantially prevented, a common chamber having a common chamber outlet, a milk line connected to a milking machine, said individual chamber outlets each leading to said common chamber and said common chamber outlet leading to said milk line, said common chamber being shaped and said individual chamber outlets being shaped and positioned with respect to each other and said common chamber to produce a swirling or vortex action in said common chamber such that flow of milk into said individual chamber outlets from said common chamber is substantially prevented, and said swirling or vortex action in said common chamber is accentuated when said fluid flow is augmented by a rapid inrush of air into said common chamber.

11. Apparatus as claimed in claim 10, wherein an air inlet hole is provided to said common chamber and said individual chamber outlets comprise tubes positioned in spaced relationship to the wall of said common chamber and to said milk line so that a rapid inrush of air through one or more individual chamber outlets passes the ends of said outlet tubes in a manner such as to induce outward flow of fluid through all of said tubes.

12. Apparatus for use in a milking machine for milking animals, said apparatus comprising a claw body, a plurality of individual chambers in said body, a milk inlet, which in use is connected to the interior of a teat cup, arranged in each said chamber so that there is one said individual chamber for each teat cup in a cluster of teat cups associated in use with said claw, an individual chamber outlet from each said individual chamber leading in use to a milk line connected to a milking machine, said inlet and said outlets from each individual chamter being arranged and each individual chamber being shaped so that fluid entering any one of said individual chambers creates a swirling or vortex action therein such that re-entry of milk from said selected individual chamber to its associated teat cup is substantially prevented, a pulsator chamber in said body, a pulsator output connector connectable to said pulsator chamber, means to connect said pulsator chamber to the pulsation cavities between the bodies of said teat cups and the outsides of the teat cup liner, a pressure sensitive member positioned between said pulsator chamber and said individual chambers, and a valve interposed between said pulsator output connector and said pulsator chamber comprising a valve seat and a valve member actuable by said pressure sensitive member in use to control the pressure in said pulsator chamber so that the maximum vacuum (minimum pressure) in said pulsator chamber does not exceed the maximum vacuum in said individual chambers.

13. Apparatus as claimed in claim 12 wherein said pressure sensitive member comprises a diaphragm part of which forms said valve member and parts of which form covers for said individual chambers.

14. Apparatus as claimed in claim 13 wherein said valve seat comprises a V-shaped member positioned and arranged so that part of said diaphragm makes progressive contact or release of contact with said valve seat to reduce or increase the size of valve opening as said diaphragm responds to changes in vacuum in said individual chambers.

* * * * *